United States Patent [19]
Kanade et al.

[11] Patent Number: 6,151,009
[45] Date of Patent: Nov. 21, 2000

[54] METHOD AND APPARATUS FOR MERGING REAL AND SYNTHETIC IMAGES

[75] Inventors: Takeo Kanade, Pittsburgh, Pa.; Kazuo Oda, Isehara, Japan; Masaya Tanaka, Pittsburgh, Pa.; Hiroshi Kano, Tsuzuki-Gun; Atsushi Yoshida, Tokyo, both of Japan

[73] Assignee: Carnegie Mellon University, Pittsburgh, Pa.

[21] Appl. No.: 08/697,213

[22] Filed: Aug. 21, 1996

[51] Int. Cl.[7] ....................................................... G06F 17/30
[52] U.S. Cl. ........................... 345/113; 345/585; 345/114; 345/115; 348/591; 348/590
[58] Field of Search .................................... 345/113, 585, 345/114, 115; 348/591, 590

[56] References Cited

U.S. PATENT DOCUMENTS

| | | | |
|---|---|---|---|
| 4,875,097 | 10/1989 | Jackson | 358/180 |
| 5,280,337 | 1/1994 | DesJardins | 358/183 |
| 5,353,068 | 10/1994 | Moriwake | 348/585 |
| 5,379,129 | 1/1995 | Othmer et al. | 358/450 |
| 5,400,080 | 3/1995 | Oka | 348/585 |
| 5,408,272 | 4/1995 | Barnett et al. | 348/585 |

OTHER PUBLICATIONS

Kanade, T., "Very Fast 3–D Sensing Hardware," Sixth International Symposium Research 1993, Oct. 2–5, 1993.

Kanade, T. "Development of a Video–Rate Stereo Machine," The Proceedings of ARPA Image Understanding Workshop, Nov. 14–16, 1994.

Kimura, S. et al., "CMU Video–Rate Stereo Machine," Mobile Mapping Symposium, May 24–26, 1995.

Kanade, T. et al., "Development of a Video–Rate Stereo Machine," Proceedings of International Robotics and Systems Conference (IROS '95), Aug. 5–9, 1995.

Wloka, M. et al., "Resolving Occlusion in Augmented Reality," ACM Symposium on Interactive 3D Graphics, 1995.

Kanade, T. et al., "Virtualized Reality: Being Mobile in a Visual Scene," International Conference on Artificial Reality and Tele–Existence/Virtual Reality Software and Technology, Japan, Nov. 1995. [See Section 5 Conclusions].

*Primary Examiner*—Thomas G. Black
*Assistant Examiner*—William Trinh
*Attorney, Agent, or Firm*—Kirkpatrick & Lockhart LLP

[57] ABSTRACT

A method for merging real and synthetic images in real time is comprised of the steps of providing a first signal containing depth and image information per pixel about a real image. A second signal containing depth and image information per pixel about a synthetic image is provided. The depth information corresponding to the real image and the depth information corresponding to the synthetic image for each pixel are compared. Based on the comparison, either the image information corresponding to the real image or the image information corresponding to the synthetic image is selected and combined. Because the image information is compared based on depth, any interaction such as occluding, shadowing, reflecting, or colliding can be determined and an appropriate output generated

28 Claims, 9 Drawing Sheets

METHOD AND APPARATUS FOR MERGING REAL AND SYNTHETIC IMAGES

BACKGROUND OF THE INVENTION

1. Field of the Invention

The present invention is directed generally to the field signal processing and, more particularly, to the field of video signal processing.

2. Description of the Background

It is known in the art to use color as a basis for merging pixel by pixel, two video signals. Chroma-keying, as the process is known, uses color information to control a switching process. A person, for example a weatherperson, stands in front of a blue screen while a first video signal is made. A second video signal is provided which is to be combined with just the weatherperson from the first video signal. The first video signal is analyzed pixel by pixel for the key, i.e., the blue of the background screen. For each blue pixel, the corresponding pixel from the second video signal is selected for the final image. Each non-blue pixel from the first video signal is selected for the final image. Through that simple process, the weatherperson is extracted from the background screen and superimposed on top of the images in the second video signal. The chroma-key process is simple enough to be performed in real time. However, the extracted image is always considered to be in front of the images from the second video signal. That may or may not result in a realistic looking final product. Furthermore, because the extracted image is always in front of the images from the second video signal, there is no physical or geometrical interaction allowed between the extracted image and the images of the second video signal.

Other methods for combining video signals are disclosed in U.S. Pat. No. 5,400,080 entitled Apparatus And Method For Combining Video Signals Representing Images Having Different Depths, U.S. Pat. No. 5,353,068 entitled Video Signal Combining Apparatus And Method, and U.S. Pat. No. 5,280,337 entitled Depth-Based Video Combining. Each of those patents discloses a method which uses depth information for combining one or more video signals. However, the patents do not disclose how to obtain the needed depth information, which is a non-trivial problem if pixel by pixel depth information is to be provided in real time for standard video signals having a frame rate of thirty frames per second. Moreover, there is no recognition in the aforementioned patents of how images from the combined video signals might interact, e.g. one image might cast a shadow on an image which is behind it in the combined video. Thus, the need exists for a method of using depth as the key for merging two video signals in real time in a way which enables the images from the combined video to interact with one another.

SUMMARY OF THE INVENTION

The present invention is directed to a method, and to an apparatus for carrying out the method, by which objects in real images and synthetic images can dynamically interact with each other in a geometrically correct manner. In this invention, a 3-D camera is used for acquiring video images and depth information for each pixel of a video image in real time. The 3-D geometry of every pixel obtained in real time is used for calculation of the geometrical relationship with objects in a synthetic image. The method is comprised of the steps of providing a first signal containing depth and image information per pixel about a real image. A second signal containing depth and image information per pixel about a synthetic image (which may include virtual images) is provided. The depth information corresponding to the real image and the depth information corresponding to the virtual or synthetic image for each pixel is compared. Based on the comparison, either the image information corresponding to the real image or the image information corresponding to the synthetic image is selected. The selected information is then combined on a per pixel basis The method and apparatus of the present invention allow for the combination, based on depth information, of two (or more) images, one real and one synthetic, in real time. Because the depth information for each pixel is known, any interaction between pixels can be determined. For example, if two pixels have the same depth information, they occupy the same point in space, which means that the sound of a collision may be generated. By knowing the relationship of a synthetic object with respect to a light source, the synthetic object may cast a shadow on a real object, or vice versa. By having real time depth information for the images to be combined, the images can be combined in a much more realistic manner. Those advantages and benefits of the present invention, and others, will become apparent from the Description of the Preferred Embodiments hereinbelow.

BRIEF DESCRIPTION OF THE DRAWINGS

For the present invention to be clearly understood and readily practiced, the present invention will be described in conjunction with the following figures wherein.

DESCRIPTION OF THE PREFERRED EMBODIMENTS

Figure 1:
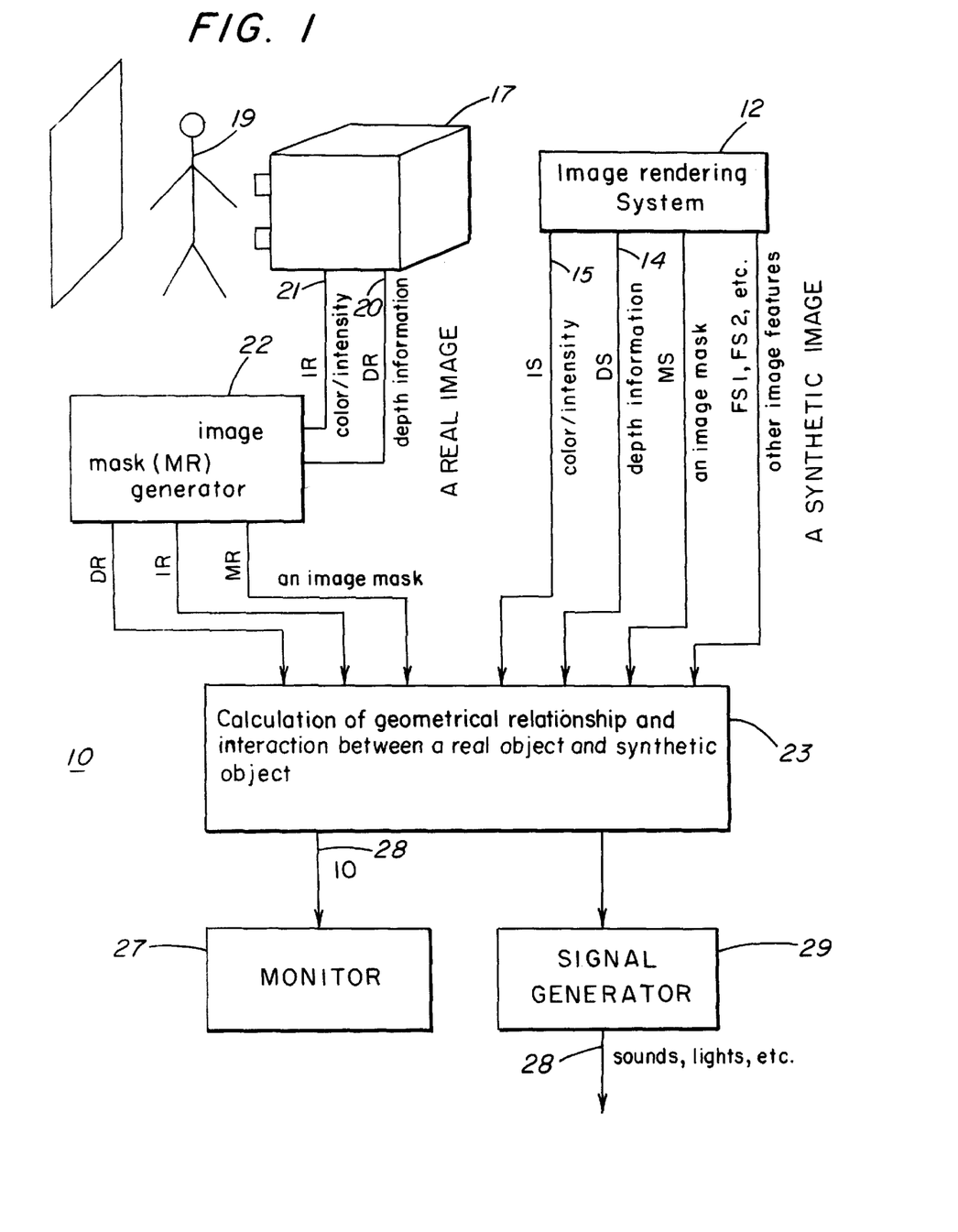
FIG. 1 is a diagram illustrating an implementation of the merging and interaction of a real image and a synthetic image according to the present invention.
Figure 2A:
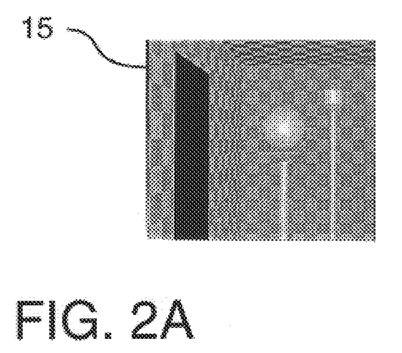
FIGS. 2A and 2B are examples of an intensity map and a depth map, respectively, for a synthesized image.
Figure 2B:
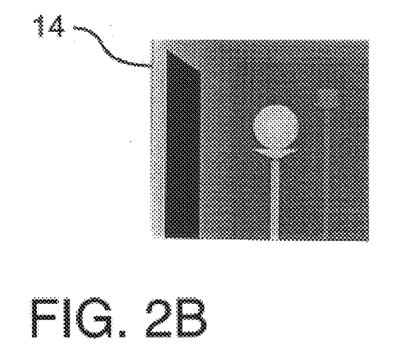

As illustrated in FIG. 1, the present invention is directed to a system 10 and method of combining, in real time, objects in real images and synthetic images. The system 10 is comprised of an image rendering system 12 which may be a commercially available CAD system for producing images for which depth information is available for each pixel. The synthetic image may be comprised of a depth image or depth map 14 (an example of which is seen in FIG. 2B) and a map 15 (an example of which is seen in FIG. 2A) which contains color, intensity, or other image information.

Figure 3A:
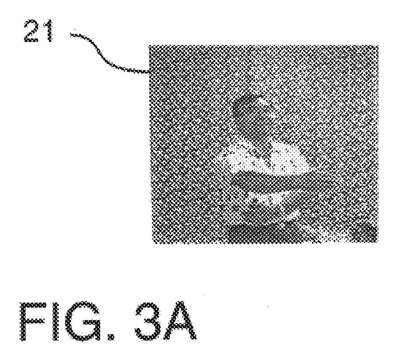
FIGS. 3A and 3B are examples of an intensity map and a depth map, respectively, for a real image.
Figure 3B:
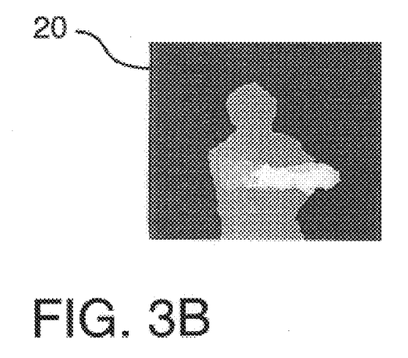

A 3-D camera 17 is provided to produce real time images of a real object 19. The 3-D camera 17 outputs video images and 3-D geometry in real time. The real-time acquisition of images and depth information is essential for dynamic interaction between real and synthetic objects. At the output of the 3-D camera 17 the 3-D geometry of a real scene is represented by a pixel-by-pixel depth map 20 (an example of which is seen in FIG. 3B) while the color, intensity, etc. is represented by a pixel-by-pixel map 21 (an example of which is seen in FIG. 3A). A video rate stereo machine is one type of device which may be used for such a 3-D camera 17. Such machines are disclosed in, for example, T. Kanada et al., *A Stereo Machine for Video Rate Dense Depth Mapping and Its New Applications,* CVPR 96, 1996, which is hereby incorporated by reference.

The 3-D coordinate (x,y,z) of an object at image coordinates (i,j) can be calculated by the following equation:

$x = XR\ (i,j,DR(i,j))$ $y = YR\ (i,j,DR(i,j))$ $z = ZR\ (i,j,DR(i,j))$ where DR(i,j) is the depth value of the real object 19 at (i,j) and XR, YR, and ZR are the camera geometry functions of the 3-D camera 17. Those camera geometry functions can be determined by existing camera calibration procedures. See, for example, R. Tsai, *A versatile camera calibration technique for high-accuracy 3D machine vision meteorology using off-the-shelf TV cameras and lenses,* IEEE Journal of Robotics and Automation, Vol. RA-3, No. 4, August 1987, and S. Kimura, et al., *CMU Video-Rate Stereo Machine, Mobile Mapping Symposium,* Columbus, Ohio, May 24–26, 1995, both of which are hereby incorporated by reference. If the z axis is parallel to the camera direction, then the z component can be simply written as:

$z = DR(i,j)$

As mentioned, synthetic images with their own 3-D geometry can be created by existing computer graphics technique. At the output of the image rendering system 12, the 3-D geometry of a synthetic scene is represented by pixel-by-pixel depth information DS(i,j). The viewing conditions of the synthetic images should be the same as the viewing conditions of the 3-D camera 17. In other words, the "camera geometry functions" of the synthetic image (XS, YS, ZS) have to be the same as those of the 3-D camera's (XR, YR, ZR). The synthesized images should be synthesized in real time if objects in the images move or the 3-D camera geometry changes. Surface features of synthetic objects such as transparency FS1, reflectivity FS2, etc. are defined explicitly, so that kind of information can be output pixel-by-pixel if needed and stored with map 15.

If there is a specific object in a synthetic image which to be combined, an image mask MS(i,j) with the following definition can be created by the image rendering system 12:

$$MS(i,j) = \begin{cases} 1 & \text{when pixel } (i,j) \text{ is on the specific object} \\ 0 & \text{when pixel } (i,j) \text{ is not on the specific object} \end{cases}$$

If there is no specific object for processing, and the entire image is to be used, an image mask value should be set at "1" for all values of (i,j).

If there is a specific object in a real image which is to be combined, an image mask MR(i,j) with the following definition can be created by an image mask generator 22, which may be a specific software routine:

$$MR(i,j) = \begin{cases} 1 & \text{when pixel } (i,j) \text{ is on the specific object} \\ 0 & \text{when pixel } (i,j) \text{ is not on the specific object} \end{cases}$$

An image mask for an object in a real image can be created using color information or depth information from the 3-D camera 17.

A typical method of creating a mask image with color information is chroma keying which extracts the region which is not in the specific color. An image mask MR(i,j) also can be created by comparing the depth information DR(i,j) and a background depth information DRb(i,j) which is captured by a 3-D camera without the specific real object:

$$MR(i,j) = \begin{cases} 1 & \text{when } DR\ (i,j) \text{ is } < DR_b(i,j) \\ 0 & \text{when } DR\ (i,j) \text{ is } \geq DR_b(i,j) \end{cases}$$

If there is no specific object for processing and the entire image is to be used, an image mask value should be set at "1" for all values of (i,j).

Figure 4:
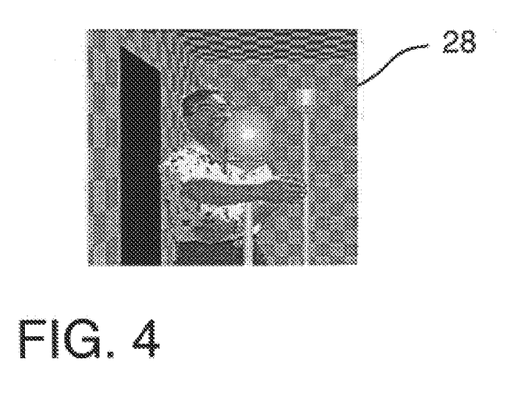
FIG. 4 is an example of an output image.

After the maps 14, 15, 20, 21 have been created, the geometrical relationship between objects in the real and the synthetic images is examined and interaction between objects is determined as shown by box 23 in FIG. 1. The typical output is one or more output images IO28 (an example of which is seen in FIG. 4) where real and synthetic images are merged and a real object and a synthetic object interact with each other. Other output signals 28 such as sounds, lights, etc., are also possible. Sounds and other output signals can be generated with existing signal generators 29. The images IO28, whether they are individual frames or a series of frames forming a video, can be displayed using any suitable monitor 27.

In the most general form, the output image IO(i,j) is determined with the following function:

$IO\ (i,j) = io\ (i,j, IR, IS, DR, DS, MR, MS, FS_1, FS_2, \ldots)$ (1)

where IR is a real image from the 3-D camera 17, DR is the pixel-by-pixel depth information corresponding to IR, IS is the synthetic image, DS is the pixel-by-pixel depth information corresponding to IS, MR is the image mask of an object in the real image, MS is the image mask of an object in the synthetic image, and $FS_1$, $FS_2$ . . . are additional pixel-by-pixel information attached to the synthetic image. Note that on the right hand side of equation (1), IR, IS, etc. are arrays which have dimensions of image size and not the local values at (i,j) (IR(i,j), IS(i,j), etc.). IR, IS, etc. also can be sequences arrays if needed. If IR and IS are color images, IR is the bundle of three image arrays IRr, IRg, and IRb which stand for red, green, and blue bands of the image IR, respectively, and is the bundle of three image arrays ISr, ISg, and ISb.

Examining objects in the real and the synthetic images can be accomplished because both the real and synthetic images have pixel-by-pixel depth information. Therefore, each pixel of the real and the synthetic images can have 3-D coordinates. That means that an output image can be created to reflect the 3-D relationship of all image pixels of the real and the synthetic images. Inputs are received from both the real and synthetic world in real time. Therefore, an object (typically a person) in the real world can dynamically interact with the synthetic (or virtual) world in real time.

The following illustrates some examples of how the geometrical relationship may be calculated.

Depth Keying

Figure 5:
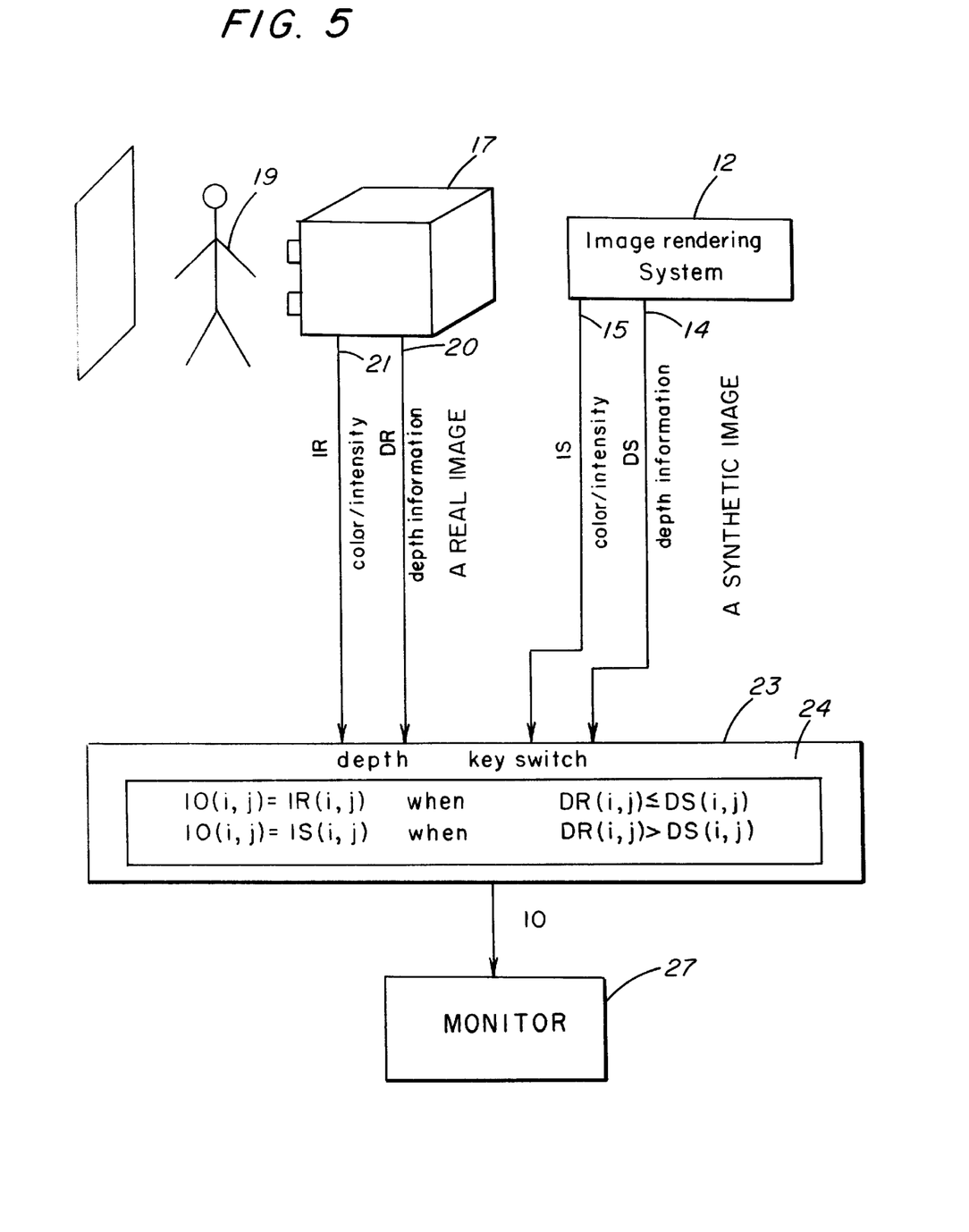
FIG. 5 is a diagram illustrating an implementation of the present invention using a pixel-by-pixel depth key switch.

Depth keying is a technique to merge real and synthetic images in a geometrically correct manner by using the pixel-by-pixel depth information (depth map) to control the image information used in the final image. As shown in FIG. 5, this technique is implemented by a depth key switch 24 which performs the function of determining the geometrical relationship of box 23. For each pixel, the depth key switch 24 compares depth information of the real and the synthetic images and routes the pixel value of the image which is nearer to the camera. Thus, the foreground image for each pixel can be determined and image created where each part of a real and a synthetic object occlude each other correctly as illustrated in the output image 28 of FIG. 4.

The function of the depth key switch 24 can be written in the following form.

$$IO(i, j) = \begin{cases} IR(i, j) & \text{when } DR(i, j) \leq DS(i, j) \\ IS(i, j) & \text{when } DR(i, j) > DS(i, j) \end{cases} \quad (2)$$

Figure 6:
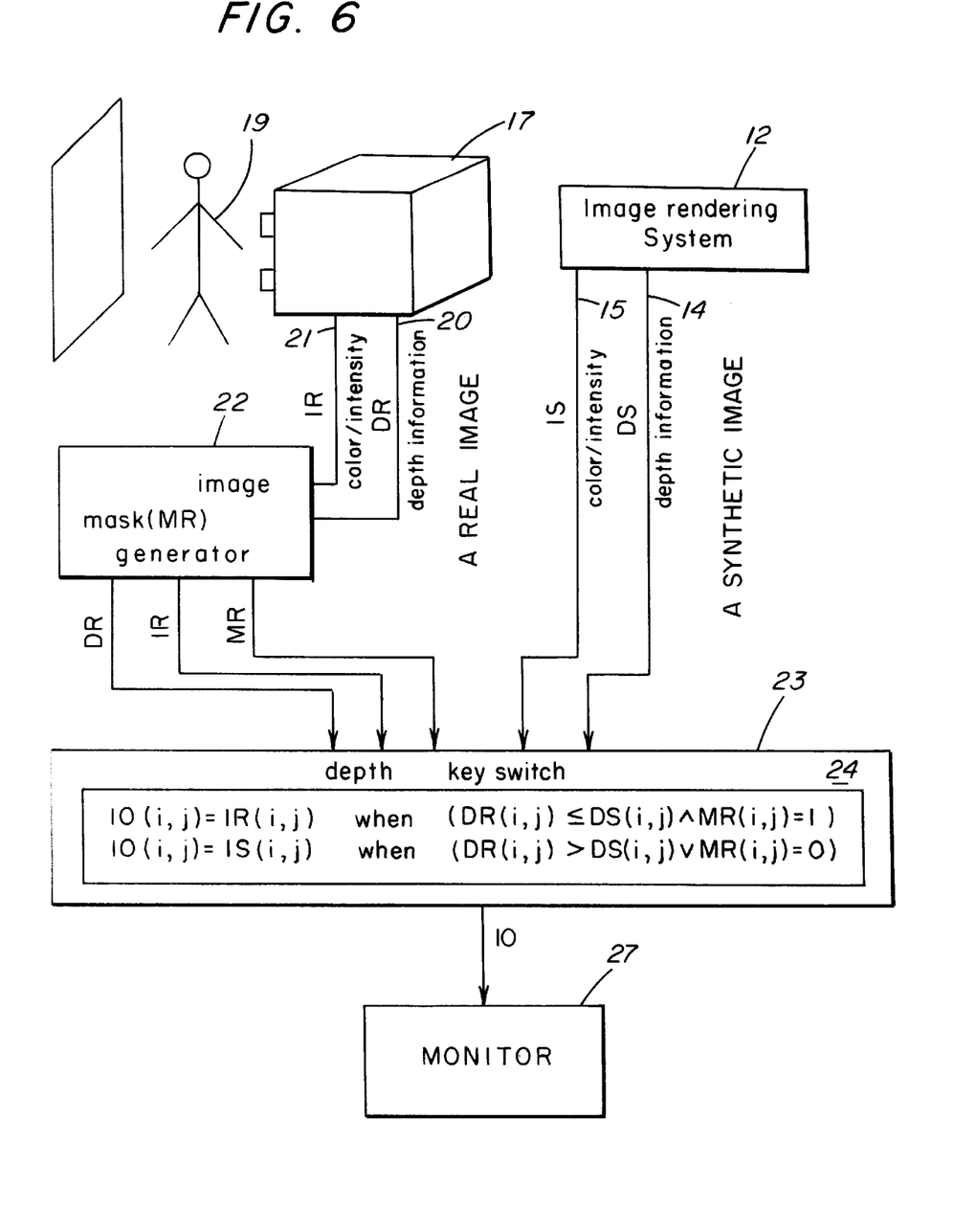
FIG. 6 is a diagram illustrating an implementation of the present invention using a pixel-by-pixel depth key switch and a image mask for a real object.

As shown in FIG. 6, the depth key switch 24 can also be used with the image mask generator 22. Thus, when there is some specific object in the real image, equation (2) can be written as following:

$$IO(i, j) = \begin{cases} IR(i, j) & \text{when } (DR(i, j) \leq DS(i, j)) \wedge (MR(i, j) = 1) \\ IS(i, j) & (\text{when } (DR(i, j) > DS(i, j)) \vee (MR(i, j) = 0)) \end{cases} \quad (3)$$

An example of a software routine, written in C language, for implementing the functionality of equations (2) and (3) is four in Appendix A.

Creating a Shadow Cast by a Synthetic Object onto a Real Object

Figure 7:
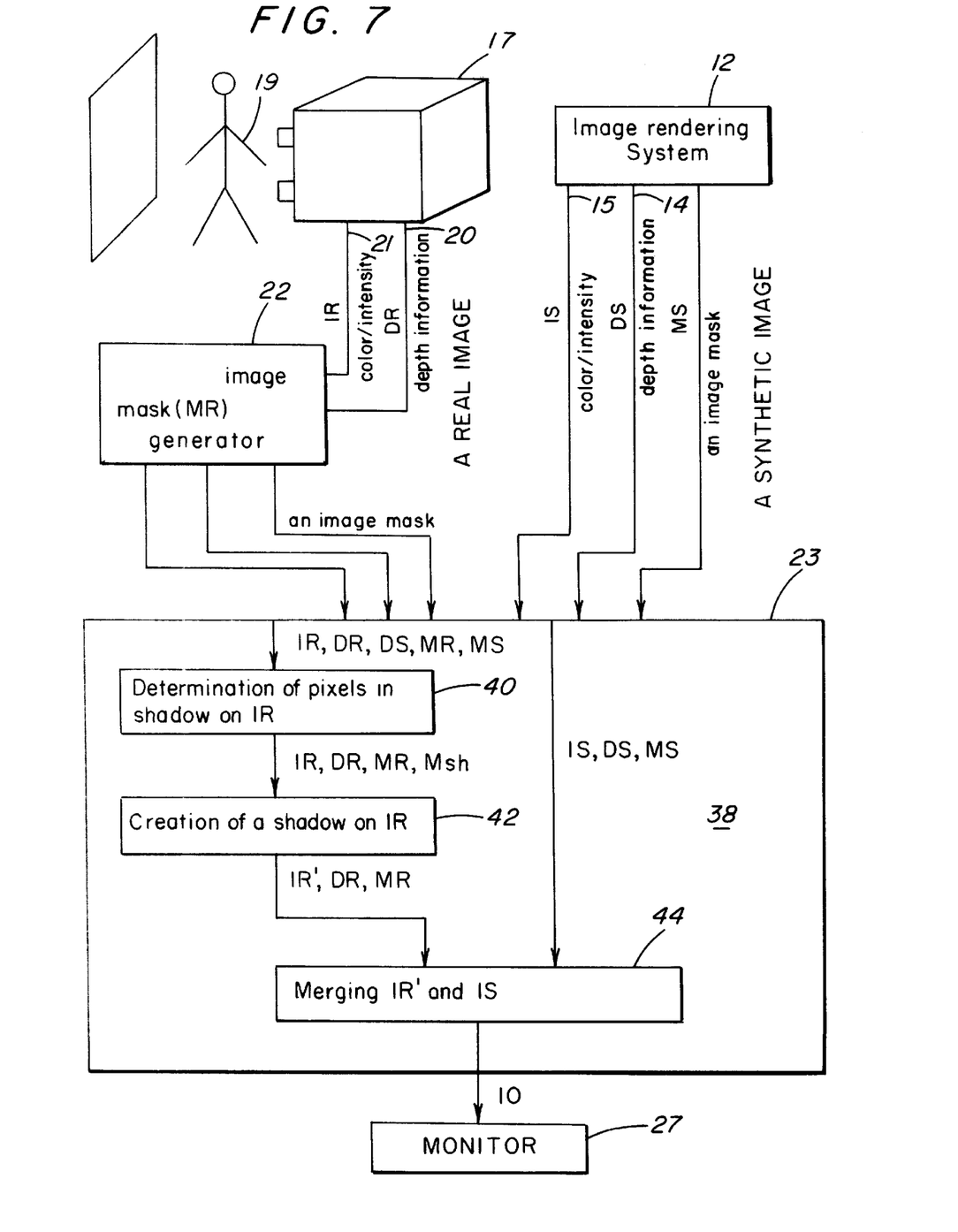
FIG. 7 is a block diagram illustrating the process for calculating a shadow cast by a synthetic image onto a real image.

A shadow cast by a synthetic object onto a real object can be created by considering the geometrical relationship between a synthetic object, a real object, and a light source. FIG. 7 is a diagram of that process. In FIG. 7, the function of the block 23 is performed by a software routine 38, an example of which, written in C language, is found in Appendix B. Basically, the shadow is created by exchanging the relevant portions of the real and synthetic images.

In FIG. 7, the routine 38 begins at step 40 where the position of the shadow on the real image IR is determined. A pixel on a real object is considered as being in the shadow of a synthetic object when a pixel on a synthetic object lays in the direction to a light source. If $V_{rs}(i,j,s,t)$ is a 3-D vector from the position of IR(i,j) to the position of IS(s,t), and $V_{ro}(i,j)$ is a 3-D vector from the position of IR(i,j) to the position of the light source, then a mask Msh(i,j) can be created which has a value of "1" if IR(i,j) is in the shadow of a synthetic object:

$Msh(i, j) = 1$ when $MR(i, j) =$ $$1 \bigwedge \left( \exists (s, t); MS(s, t) = 1 \bigwedge \frac{V_{rs}(i, j, s, t) \otimes V_{ro}(i, j)}{|V_{rs}(i, j, s, t)| \cdot |V_{ro}(i, j)|} > \cos \Theta_{th} \right)$$

$Msh(i, j) = 0$ when otherwise where the operator ($\oplus$) is the inner product and $\Theta_{th}$ is a threshold angle.

A new image IR' containing the shadow is created at step 42 with the following equation.

$$IR'(i, j) = \begin{cases} IR(i, j) & \text{when } Msh(i, j) = 0 \\ Sh(IR(i, j)) & \text{when } Msh(i, j) = 1 \end{cases}$$

where Sh is a function for calculating a pixel value in a shadow. For example, Sh can be as below:

$Sh (IR (i,j)) = k \cdot IR (i,j)$ where k is a constant value between 0 and 1.

Figure 8:
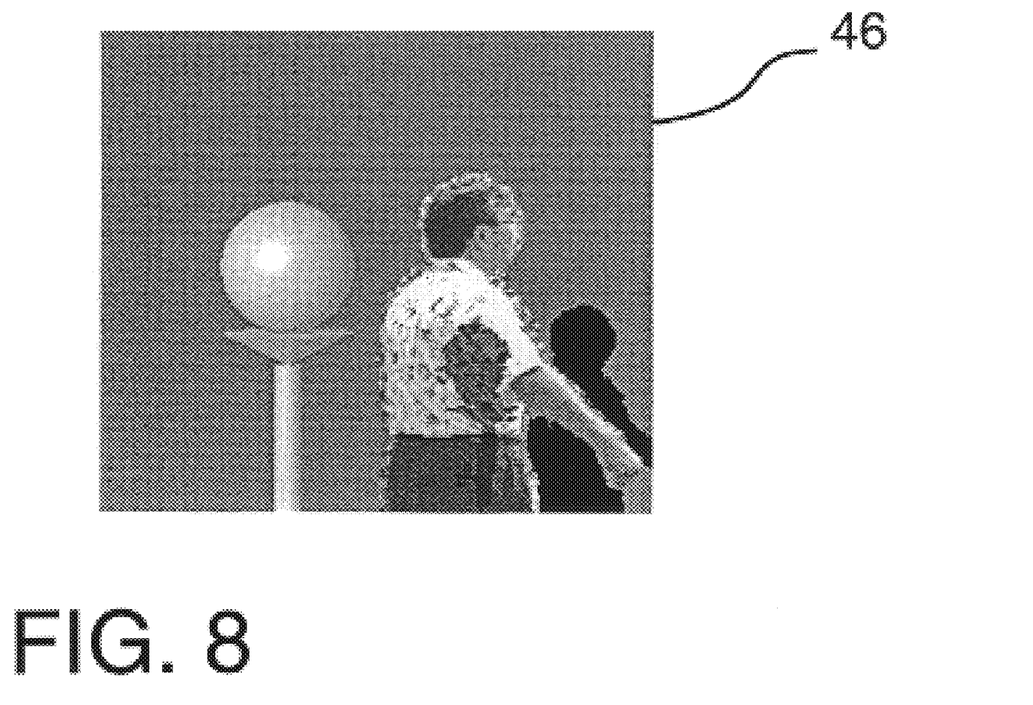
FIG. 8 is an example of an image with a shadow cast by a synthetic object.

Finally, at step 44, IR' and IS are merged by, for example, the depth keying method described above. An example of such an image 46 is illustrated in FIG. 8.

Figure 9:
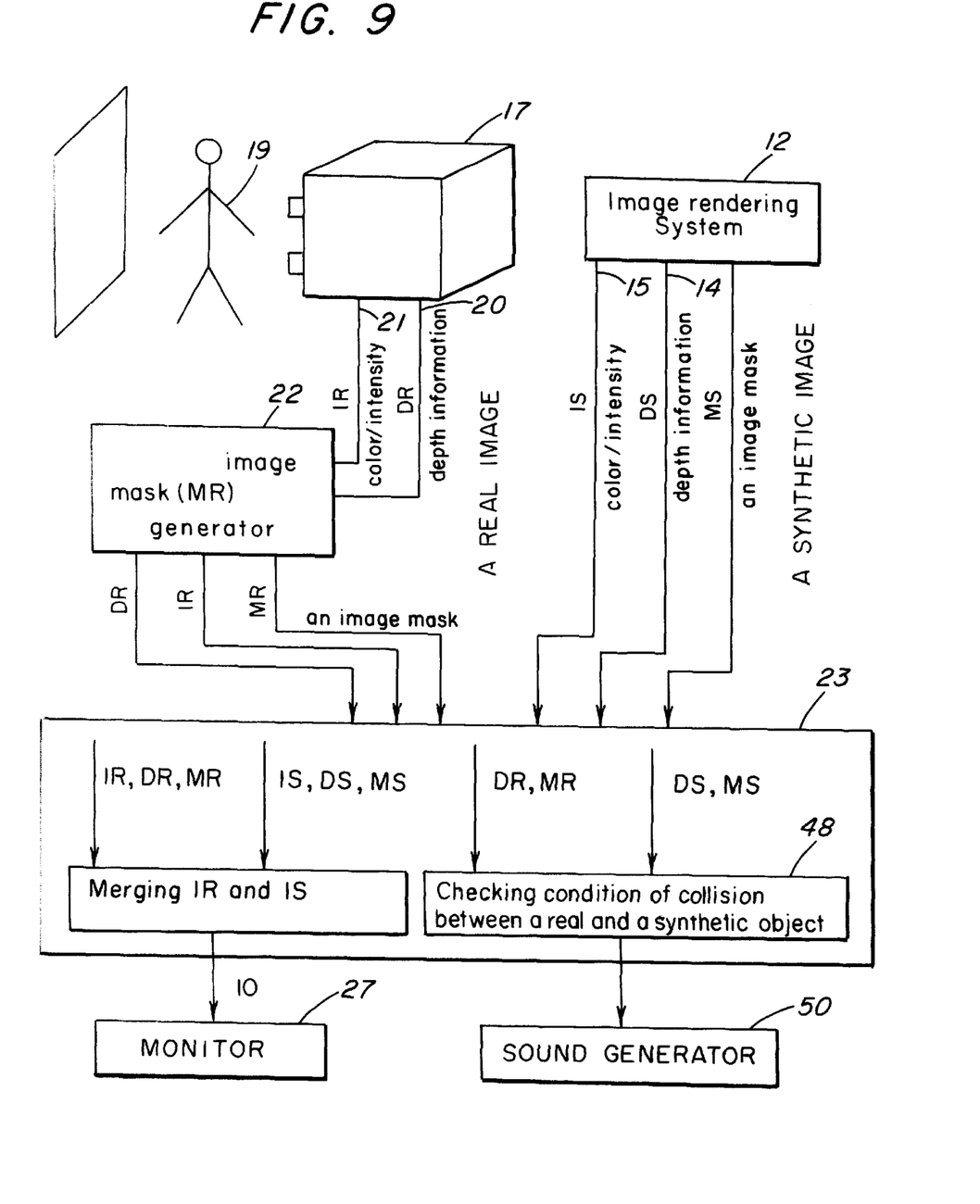
FIG. 9 is a diagram illustrating the process for calculating the generation of a sound resulting from the collision of a synthetic object and a real object.

Generating Sound Resulting from the Collision of a Real Object and a Synthetic Object In the geometrical calculation process, it is possible to compute the geometrical condition for generating signals other than images. For example, a sound can be generated when a collision between a synthetic and a real object occurs. That process is illustrated in FIG. 9 wherein the computation of the geometrical condition for generating signals other than images is performed by a software routine 48 which may be incorporated into the functionality of box 23.

The condition of the collision of a real object and a synthetic object can be denoted with a pixel count threshold $N_{th}$ and a collision distance threshold $D_{th}$:

$N_{th} < \Sigma MR (i,j) \cdot MD (i,j)$ where $MD(i, j) = 1$ when $MR(i, j) = 1 \wedge (\exists (s, t); MS(s, t) = 1 \wedge |V_{rs}(i, j, s, t)| \leq D_{th})$ $MD(i, j) = 0$ when otherwise A sound generator 50, or other appropriate signal generator, may be provided to produce an audible output.

Creating a Reflection in a Virtual Mirror

Figure 10:
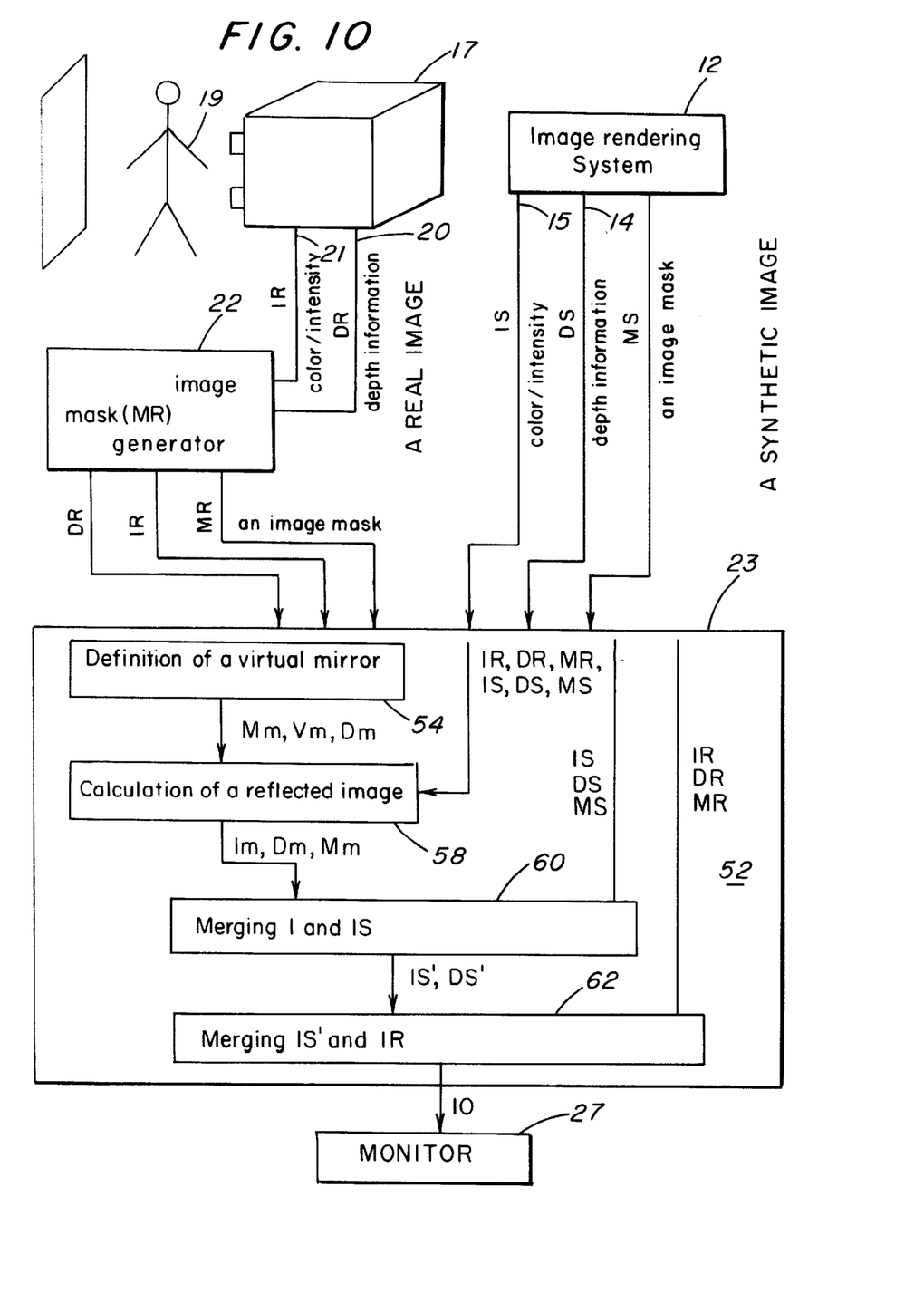
FIG. 10 is a diagram illustrating the creation of a reflection in a synthetic mirror.

A virtual mirror which reflects both real and synthetic objects can be created by considering the geometrical relationship between a synthetic object, a real object, a virtual mirror, and the camera position. That process can be implemented as a software routine 52 as part of the functionality of box 23 as shown in FIG. 10. The process begins at step 54 by defining a virtual mirror (56 in FIG. 11), which contains the following information:

Mm(i,j): an image mask which is 1 if a pixel (i,j) is on the mirror, otherwise 0.

Vm(i,j): unit vectors of a mirror surface direction at a pixel (i,j).

Dm(i,j): depth information of a mirror surface at a pixel (i,j).

Figure 11:
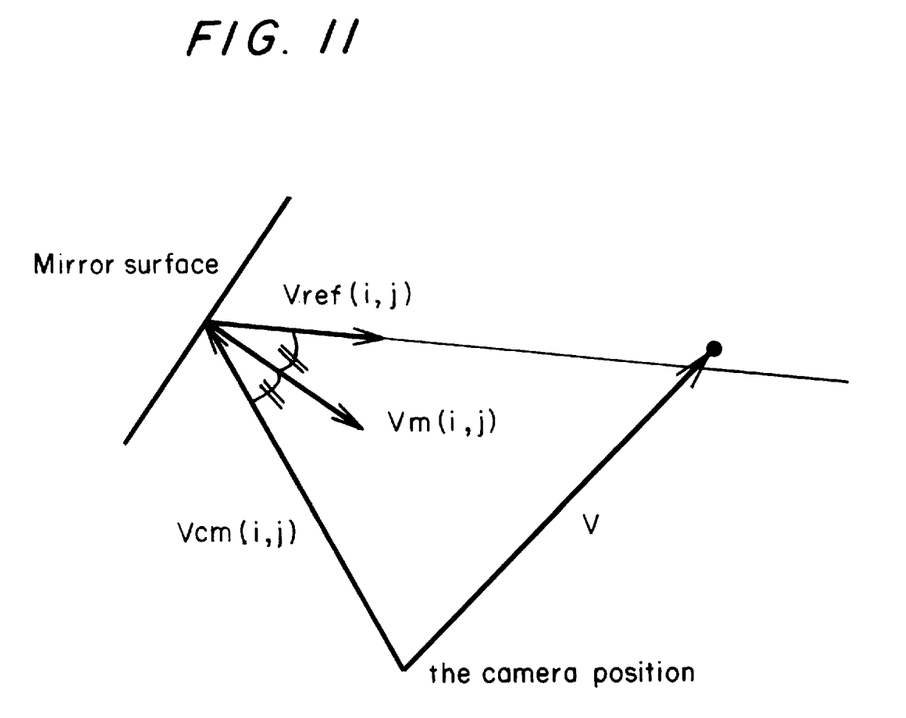
FIG. 11 is a diagram which aids in the description of the process of creating a reflection in a synthetic mirror.

Each 3-D position of a mirror surface at a pixel (i,j) is calculated with the camera geometry functions and depth information. Referring to FIG. 11, Vcm(i,j) is a vector from the camera position to the mirror's 56 surface. If Mm(i,j)=1, a unit vector Vref(i,j) of the direction from the mirror's 56 surface to an object which is supposed to be reflected by the mirror 56 is:

$$Vref(i, j) = \frac{Vcm(i, j) - 2(Vcm(i, j) \otimes Vm(i, j))Vm(i, j)}{|Vcm(i, j) - 2(Vcm(i, j) \otimes Vm(i, j))Vm(i, j)|}$$

Thus, we can denote the condition that an image pixel whose position from the camera (V) is on the direction Vref(i,j) from the mirror's 56 surface (Vcm(i,j)) as follows:

$$\frac{(V - Vcm(i, j)) \otimes Vref(i, j)}{|V - Vcm(i, j)| \cdot |Vref(i, j)|} > \cos\theta_{th}$$

where $\Theta_{th}$ is a threshold angle. That condition can be examined for each pixel of IR(i,j) and IS(i,j) using pixel-by-pixel depth information DR and DS, respectively. That examination can be eliminated for the pixels whose image mask value MR(i,j) or MS(i,j) is 1. The reflected image pixel is the pixel which has the smallest value of |V−Vcm(i,j)| among the pixels which satisfies that condition. Applying that condition for all IR and IS, we get a reflected image Im(i,j) at step 58. If no pixel of IR or IS satisfies that condition, Im(i,j) is assigned a default intensity (or color), for example, zero (or black).

With an image mask Mm and pixel-by-pixel depth information Dm, the reflected image IM can be merged with a synthetic image IS by, for example, depth keying as shown by step 60. The image information IS', DS' output by step 60 may then be merged, for example, by depth keying as shown by step 62. This time, the depth information of IS' (i.e., DS') has the following definition:

$$DS'(i, j) = Dm(i, j) \text{ when } Dm(i, j) \leq DS(i, j) \wedge Mm(i, j) = 1$$

$$DS'(i, j) = DS(i, j) \text{ when } Dm(i, j) > DS(i, j) \vee Mm(i, j) = 0$$

The same principals may be used to enable synthetic images to be reflected in real mirrors or other similarly reflective objects.

Set forth in the Appendices hereto is specific software, i.e. specific program code segments, that are employed to configure a general purpose microprocessor to create specific logic circuits. Those circuits are intended to be "means" corresponding to any claimed means limitations. Those of ordinary skill in the art will recognize that many aspects of the present invention such as the image rendering system 12, image mask generator 22, and the functionality of box 23, as well as the generation of appropriate output signals, may be implemented in software. When implemented in software, the software may be carried by any appropriate computer media, such as disks, CD ROMs, tapes, etc.

While the present invention has been described in conjunction with preferred embodiments thereof, many modifications and variations will be apparent to those of ordinary skill in the art. The foregoing description and the following claims are intended to cover all such modifications and variations.

APPENDIX A

Depth-Key C

```
#include <stdio.h>
#include <stdlib.h>
/* z keying */
/* This code is for using with mr. */
z_key(orig,depth,mr,origs,depths,out,II_OUT,JJ_OUT)
unsigned char   *orig;      /* a real image (intensity) IR */
float *depth;               /* depth information for the real image DR */
int *mr;                    /* an image mask for a real image MR */
unsigned char   *origs;     /* a synthetic image (intensity) IS */
float *depths;              /* depth information for the synthetic image DS */
unsigned char   *out;       /* output image (intensity) IO */
int II_OUT;                 /* image row size */
int JJ_OUT;                 /* image column size */
{
    int i;
    unsigned char *orgptr,*orgsptr,*outptr;
    float *dptptr,*dptsptr;
    int *mrptr;
    orgptr = orig;
    dptptr = depth;
    orgsptr = origs;
    dptsptr = depths;
    outptr = out;
    mrptr = mr;
    for(i=0;i<JJ_OUT*II_OUT;i++)
    {
        if((*dptptr)<=(*dptsptr)&&(*mrptr)==1)
            *outptr = *orgptr;
        else
            *outptr = *orgsptr;
/* if you do not want to use mr, please use following code */
/*
        if((*dptptr)<=(*dptsptr))
            *outptr = *orgptr;
        else
            *outptr = *orgsptr;
*/
        dptptr++;
```

APPENDIX A-continued

Depth-Key C

```
        orgptr++;
        orgsptr++;
        dptsptr++;
        outptr++;
        mrptr++;
    }
}
```

APPENDIX B shadow c

```
#include <stdio.h>
#include <stdlib.h>
#include <math.h>
#define ANGLE_THRESHOLD   0.05
#define SHADOW_COEF 0.50
typedef struct
{
float x;
float y;
float z;
} XYZ;
typedef XYZ CRD;
extern convCrdToXyz();
/* convert column, row, depth information to 3-d coordinates (x,y,z)
(Not disclosed here. Use some proper function)
convCrdToXyz(crd,xyz)
CRD *crd;       Column, Row, and Depth information (input)
XYZ *xyz;       X,Y,Z (output)
{
}
*/
/* calculate the inner product of v1 and v2 */
double inner_product(v1,v2)
XYZ *v1,*v2;
{
    return((double)((v1->x)*(v2->x)+(v1->y)*(v2->y)+(v1->z)*(v2->z)));
}
/* subtract xyz2 from xyz1 */
subXyz(xyz1,xyz2,outxyz)
XYZ *xyz1,*xyz2,*outxyz;
{
    outxyz->x = (xyz1->x) - (xyz2->x);
    outxyz->y = (xyz1->y) - (xyz2->y);
    outxyz->z = (xyz1->z) - (xyz2->z);
}
/* calculate the length of vec */
double vabs(vec)
XYZ *vec;
{
    return((double)((vec->x)*(vec->x)+(vec->y)*(vec->y)+(vec->z)*(vec->z)));
}
/* Determination of pixels in shadow on IR */
makeMsh(orgdpt,mr,backdpt,ms,xyzlight,II_OUT,JJ_OUT,msh)
float *orgdpt;    /* depth information for a real image */
int *mr;          /* an image mask for a real image */
float *backdpt;   /* depth information for a synthetic image */
int *ms;          /* an image mask for a synthetic image */
XYZ xyzlight;     /* coordinates of a light origin */
int II_OUT;       /* image row size */
int JJ_OUT;       /* image column size */
int *msh;         /* an image mask for a virtual shadow (output) */
{
    int i,j,k,l;
    CRD crd;
    XYZ xyz,xyz2;
    XYZ vrs,vro;         /* Vrs, Vro */
    double avrs,avro;
    double costh;        /* Cos(ANGLE_THRESHOLD) */
    double inp;
```

APPENDIX B-continued shadow c

```
        costh = cos(ANGLE_THRESHOLD);
        for(i=0;i<II_OUT;i++)
        {
            for(j=0;j<JJ_OUT;j++)
            {
                if(mr[i*JJ_OUT+j]==1)
                {
                    msh[i*JJ_OUT+j]=0;
/* calculation of Vro */
                    crd.z = orgdpt[i*JJ_OUT+j];
                    crd.x = j;
                    crd.y = i;
                    convCrdToXyz(&crd,&xyz);
                    subXyz(&xyz,&xyzlight,&vro);
                    for(k=0;k<II_OUT;k++)
                    {
                        for(l=0;1<JJ_OUT;1++)
                        {
/* calculation of Vrs */
                            crd.z = backdpt[k*JJ_OUT+1];
                            crd.x = l;
                            crd.y = k;
                            convCrdToXyz(&crd,&xyz2);
                            subXyz(&xyz,&xyz2,&vrs);
                            inp = inner_product(&vrs,&vro);
                            avrs = vabs(&vrs);
                            avro = vabs(&vro);
                            if(((inp/avrs/avro)>costh)&&(ms[k*JJ_OUT+1]==1))
                                msh[i*JJ_OUT+j]=1;
                        }
                    }
                }
            }
        }
}
/* creation of a shadow on IR */
addShadow(org,msh,II_OUT,JJ_OUT)
unsigned char *org;     /* a real image (intensity) */
int *msh;               /* an image mask for a virtual shadow (output) */
int II_OUT;             /* image row size */
int JJ_OUT;             /* image column size */
{
    int i,j;
    for(i=0;i<II_OUT;i++)
    {
        for(j=0;j<JJ_OUT;j++)
        {
            if(msh[i*JJ_OUT+j]==1)
                org[i*JJ_OUT+j] = (unsigned char)((org[i*JJ_OUT+j])*SHADOW_COEF);
        }
    }
}
/* making a virtual shadow cast by a synthetic object on a real object */
makeShadow(org,orgdpt,mr,back,backdpt,ms,xyzlight,II_OUT,JJ_OUT,msh,out)
unsigned char *org;         /* a real image (intensity) */
float *orgdpt;              /* depth information for the real image */
int *mr;                    /* an image mask for a real image */
unsigned char *back;        /* a synthetic image (intensity) */
float *backdpt;             /* depth information for the synthetic image */
int *ms;                    /* an image mask for a synthetic image */
XYZ xyzlight;               /* coordinates of a light origin */
int II_OUT;                 /* image row size */
int JJ_OUT;                 /* image column size */
int *msh;                   /* an image mask for a virtual shadow (output) */
unsigned char *out;
{
/* Determination of pixels in shadow on IR */
    makeMsh(orgdpt,mr,backdpt,ms,xyzlight,II_OUT,JJ_OUT,msh);
/* creation of a shadow on IR */
    addShadow(org,msh,II_OUT,JJ_OUT);
/* z keying */
    z_key(org,orgdpt,mr,back,backdpt,out,II_OUT,JJ_OUT);
}
/* z keying */
z_key(orig,depth,mr,origs,depths,out,II_OUT,JJ_OUT)
unsigned char   *orig;      /* a real image (intensity) */
float *depth;               /* depth information for the real image */
```

APPENDIX B-continued shadow c

```
int *mr;                        /* an image mask for a real image */
unsigned char      *origs;      /* a synthetic image (intensity) */
float *depths;                  /* depth information for the synthetic image */
unsigned char      *out;        /* output image (intensity) */
int II_OUT;                     /* image row size */
int JJ_OUT;                     /* image column size */
{
    int i;
    unsigned char *orgptr,*orgsptr,*outptr;
    float *dptptr,*dptsptr;
    int *mrptr;
    orgptr = orig;
    dptptr = depth;
    orgsptr = origs;
    dptsptr = depths;
    outptr = out;
    mrptr = mr;
    for(i=0;i<JJ_OUT*II_OUT;i++)
    {
        if((*dptptr)<=(*dptsptr)&&(*mrptr)==1)
            *outptr = *orgptr;
        else
            *outptr = *orgsptr;
        dptptr++;
        orgptr++;
        orgsptr++;
        dptsptr++;
        outptr++;
        mrptr++;
    }
}
```

What is claimed is:

1. A method of merging a real image and a synthetic image in real time, comprising:

providing a first signal containing depth and image information per pixel about said real image;

providing a second signal containing depth and image information per pixel about said synthetic image;

comparing said depth information corresponding to said real image and said depth information corresponding to said synthetic image for each pixel;

selecting one of said image information corresponding to said real image and said image information corresponding to said synthetic image in response to said comparison step for each pixel;

combining the selected information to produce an output signal;

calculating an interaction between images in the first signal and the second signal, wherein said interaction is selected from the group consisting of occlusions, collisions, shadows, and reflections; and generating output signals based on said calculated interaction.

2. The method of claim 1 wherein said generating step includes the step of generating an audible output signal.

3. The method of claim 1 wherein said generating step includes the step of generating a visible output signal.

4. The method of claim 1 additionally comprising the step of producing an image mask for an object in said first signal and wherein said comparing step includes the step of comparing said depth information corresponding to only said image mask and said depth information corresponding to said synthetic image for each pixel.

5. The method of claim 1 additionally comprising the step of producing an image mask for an object in said second signal, and wherein said comparing step includes the step of comparing depth information corresponding to said real image and said depth information corresponding to only said image mask for each pixel.

6. A method of merging images in real time, comprising:

providing first and second signals containing depth and image information per pixel about first and second images, wherein said first and second images are selected from the group consisting of real images and synthetic images;

producing an image mask for an object in said second signal;

comparing said depth information corresponding to said first image and said depth information corresponding to said second image for each pixel, said comparing includes comparing depth information corresponding to said first image and said depth information corresponding to only said image mask for each pixel;

selecting one of said image information corresponding to said first image and said image information corresponding to said second image in response to said comparison step for each pixel; and combining the selected information to produce an output signal.

7. The method of claim 6 additionally comprising the steps of calculating an interaction between images in the first signal and the second signal and generating output signals based on said calculated interaction, wherein said interaction is selected from the group consisting of collisions, shadows, and reflections.

8. The method of claim 7 wherein said generating step includes the step of generating an audible output signal.

9. The method of claim 7 wherein said generating step includes the step of generating a visible output signal.

10. A method of determining interactions between objects in a real image and objects in a synthetic image, comprising:

providing a first signal containing depth and image information per pixel about said real image;

providing a second signal containing depth and image information per pixel about said synthetic image;

comparing said depth information corresponding to said real image and said depth information corresponding to said synthetic image for each pixel; and calculating interaction based on said comparison step, wherein said interaction is selected from the group consisting of occlusions, collisions, shadows, and reflections.

11. A method of merging a real image and a synthetic image in real time, comprising:

providing a first signal containing depth and image information per pixel about said real image;

providing a second signal containing depth and image information per pixel about said synthetic image;

producing an image mask for an object in said first signal;

comparing said depth information corresponding to said real image and said depth information corresponding to said synthetic image for each pixel, said comparing includes comparing said depth information corresponding to only said image mask and said depth information corresponding to said synthetic image for each pixel;

selecting one of said image information corresponding to said real image and said image information corresponding to said synthetic image in response to said comparison step for each pixel; and combining the selected information to produce an output signal.

12. The method of claim 11 additionally comprising the steps of calculating an interaction between images in the first signal and the second signal and generating output signals based on said calculated interaction, wherein said interaction is selected from the group consisting of occlusions, collisions, shadows, and reflections.

13. The method of claim 12 wherein said generating step includes the step of generating an audible output signal.

14. The method of claim 12 wherein said generating step includes the step of generating a visible output signal.

15. A method of merging a real image and a synthetic image in real time, comprising:

providing a first signal containing depth and image information per pixel about said real image;

providing a second signal containing depth and image information per pixel about said synthetic image;

producing an image mask for an object in said second signal;

comparing said depth information corresponding to said real image and said depth information corresponding to said synthetic image for each pixel, said comparing includes comparing depth information corresponding to said real image and said depth information corresponding to only said image mask for each pixel;

selecting one of said image information corresponding to said real image and said image information corresponding to said synthetic image in response to said comparison step for each pixel; and combining the selected information to produce an output signal.

16. The method of claim 15 additionally comprising the steps of calculating an interaction between images in the first signal and the second signal and generating output signals based on said calculated interaction, wherein said interaction is selected from the group consisting of occlusions, collisions, shadows, and reflections.

17. The method of claim 16 wherein said generating step includes the step of generating an audible output signal.

18. The method of claim 16 wherein said generating step includes the step of generating a visible output signal.

19. A method of merging images in real time, comprising:

providing first and second signals containing depth and image information per pixel about first and second images, wherein said first and second images are selected from the group consisting of real images and synthetic images;

comparing said depth information corresponding to said first image and said depth information corresponding to said second image for each pixel;

selecting one of said image information corresponding to said first image and said image information corresponding to said second image in response to said comparison step for each pixel;

combining the selected information to produce an output signal;

calculating an interaction between images in said first and second signals wherein said interaction is selected from the group consisting of collisions, shadows, and reflections; and generating output signals based on said calculated interaction.

20. The method of claim 19 wherein said generating step includes the step of generating an audible output signal.

21. The method of claim 19 wherein said generating step includes the step of generating a visible output signal.

22. The method of claim 19 additionally comprising the step of producing an image mask for an object in said first signal and wherein said comparing step includes the step of comparing said depth information corresponding to only said image mask and said depth information corresponding to said second image for each pixel.

23. The method of claim 19 additionally comprising the step of producing an image mask for an object in said second signal, and wherein said comparing step includes the step of comparing depth information corresponding to said first image and said depth information corresponding to only said image mask for each pixel.

24. A method of determining interactions between objects in a first image and objects in a second image, comprising:

providing first and second signals containing depth and image information per pixel about said first and second images, wherein said first and second images are selected from the group consisting of real images and synthetic images;

comparing said depth information corresponding to said first image and said depth information corresponding to said second image for each pixel; and calculating an interaction based on said comparison step, wherein said interaction is selected from the group consisting of collisions, shadows, and reflections.

25. A method of merging images in real time, comprising:

providing first and second signals containing depth and image information per pixel about first and second images, wherein said images are selected from the group consisting of real images and synthetic images;

producing an image mask for an object in said first signal;

comparing said depth information corresponding to said first image and said depth information corresponding to said second image for each pixel, said comparing includes comparing said depth information corresponding to only said image mask and said depth information corresponding to said second image for each pixel;

selecting one of said image information corresponding to said first image and said image information corresponding to said second image in response to said comparison step for each pixel; and combining the selected information to produce an output signal.

26. The method of claim 25 additionally comprising the steps of calculating an interaction between images in the first signal and the second signal and generating output signals based on said calculated interaction, wherein said interaction is selected from the group consisting of collisions, shadows, and reflections.

27. The method of claim 26 wherein said generating step includes the step of generating an audible output signal.

28. The method of claim 26 wherein said generating step includes the step of generating a visible output signal.

* * * * *

UNITED STATES PATENT AND TRADEMARK OFFICE
CERTIFICATE OF CORRECTION

PATENT NO. : 6,151,009                                    Page 1 of 1
DATED : November 21, 2000
INVENTOR(S) : Kanade et al.

It is certified that error appears in the above-identified patent and that said Letters Patent is hereby corrected as shown below:

Column 1,
Line 11, after "merging", insert -- , --.

Column 4,
Line 54, after "respectively," delete "and is" and replace therewith -- and IS is --.

Column 5,
Line 34, delete "four" and replace therewith -- found --.

Signed and Sealed this

Thirtieth Day of April, 2002

Attest:

JAMES E. ROGAN
*Attesting Officer*        *Director of the United States Patent and Trademark Office*